(12) United States Patent
Ueno et al.

(10) Patent No.: US 7,954,852 B2
(45) Date of Patent: Jun. 7, 2011

(54) TILT TELESCOPIC STEERING DEVICE

(75) Inventors: Osamu Ueno, Saitama-ken (JP);
Takahiro Furuhashi, Saitama-ken (JP);
Naoyuki Takezawa, Gunma-ken (JP);
Minoru Takakusaki, Gunma-ken (JP);
Toshihito Osawa, Gunma-ken (JP)

(73) Assignees: Honda Motor Co., Ltd., Tokyo (JP);
Yamada Manufacturing Co., Ltd.,
Gunma-ken (JP)

( * ) Notice: Subject to any disclaimer, the term of this patent is extended or adjusted under 35 U.S.C. 154(b) by 112 days.

(21) Appl. No.: 12/222,905

(22) Filed: Aug. 19, 2008

(65) Prior Publication Data

US 2009/0066070 A1 Mar. 12, 2009

(30) Foreign Application Priority Data

Sep. 7, 2007 (JP) ................................ 2007-233251

(51) Int. Cl.
*B62D 1/184* (2006.01)
(52) U.S. Cl. ......................................... 280/775; 74/493
(58) Field of Classification Search .................. 280/775; 74/493
See application file for complete search history.

(56) References Cited

U.S. PATENT DOCUMENTS

| | | | | |
|---|---|---|---|---|
| 4,594,909 A * | 6/1986 | Yamaguchi | ...................... | 74/493 |
| 4,691,587 A * | 9/1987 | Farrand et al. | ................... | 74/493 |
| 6,095,012 A * | 8/2000 | Lutz | ................ | 74/493 |
| 6,474,189 B1 * | 11/2002 | Koellisch et al. | ............... | 74/493 |
| 6,604,439 B2 * | 8/2003 | Gaukel | ............................ | 74/493 |
| 6,662,674 B2 * | 12/2003 | Cartwright et al. | ............. | 74/493 |
| 6,688,644 B2 * | 2/2004 | Tsunoda et al. | ............... | 280/777 |
| 6,766,712 B2 * | 7/2004 | Koellisch et al. | ............... | 74/493 |
| 6,829,962 B2 * | 12/2004 | Cartwright | ...................... | 74/493 |
| 6,863,305 B2 * | 3/2005 | Hobaugh, II | ................... | 280/775 |
| 6,964,432 B2 * | 11/2005 | Morita et al. | .................. | 280/775 |
| 7,047,836 B2 * | 5/2006 | Hobaugh, II | ..................... | 74/493 |
| 7,387,045 B2 * | 6/2008 | Klukowski et al. | ................ | 74/493 |
| 7,401,814 B2 * | 7/2008 | Yasuhara et al. | .............. | 280/775 |
| 7,413,222 B2 * | 8/2008 | Higashino et al. | ............. | 280/775 |
| 7,533,594 B2 * | 5/2009 | Menjak et al. | .................. | 74/493 |
| 7,658,125 B2 * | 2/2010 | Inayoshi et al. | ............... | 74/493 |
| 7,685,903 B2 * | 3/2010 | Streng et al. | .................... | 74/493 |
| 7,717,463 B2 * | 5/2010 | Fong | ............................. | 280/775 |
| 2003/0025315 A1 * | 2/2003 | Matsumiya | .................... | 280/775 |
| 2006/0090587 A1 * | 5/2006 | Kanzler et al. | ................... | 74/493 |

(Continued)

FOREIGN PATENT DOCUMENTS

CN 1840404 A 10/2006

(Continued)

*Primary Examiner* — Paul N Dickson
*Assistant Examiner* — Nicole Verley
(74) *Attorney, Agent, or Firm* — McGinn Intellectual Property Law Group, PLLC

(57) ABSTRACT

An object of the present invention is to markedly increase the tilt holding force of a tilt telescopic column. A tilt telescopic steering device includes: a fixed bracket 1 fixed to a vehicle; a movable bracket 2 capable of moving relative to the fixed bracket 1; an intermediate bracket 3 which movably supports the movable bracket 2 in an axial direction, is rotatably pivoted on the fixed bracket 1 and is provided with a bearing 301 for rotatably supporting a steering shaft 101; a lock shaft 4 for tiltably and telescopically fixing the fixed bracket 1 and the movable bracket 2 at a predetermined position; and a connecting shaft 5 for telescopically fixing the movable bracket 2 and the intermediate bracket 3.

13 Claims, 9 Drawing Sheets

U.S. PATENT DOCUMENTS

2007/0069513 A1 * 3/2007 Kirihara et al. ............... 280/775

FOREIGN PATENT DOCUMENTS

| | | | |
|---|---|---|---|
| JP | 62039364 A * | 2/1987 | |
| JP | 2005-007905 | 1/2005 | |
| JP | 2005-125994 | 5/2005 | |
| JP | 2006-151011 | 6/2006 | |

* cited by examiner

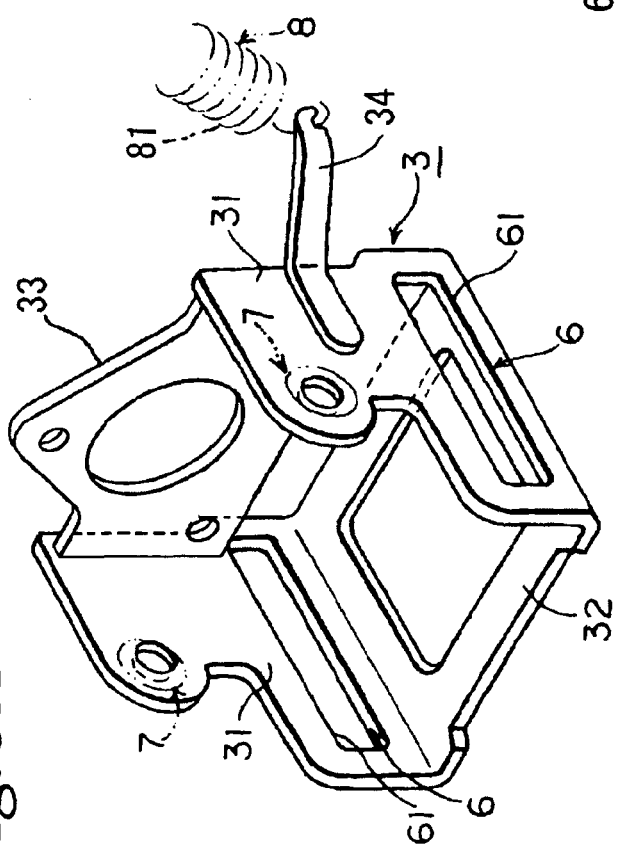
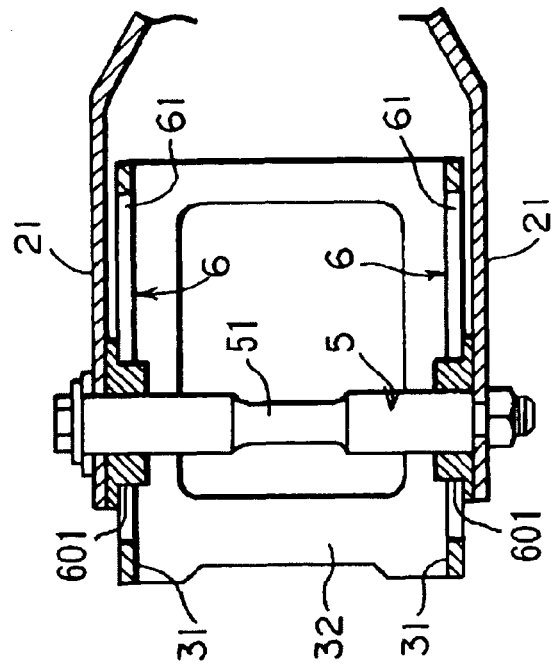

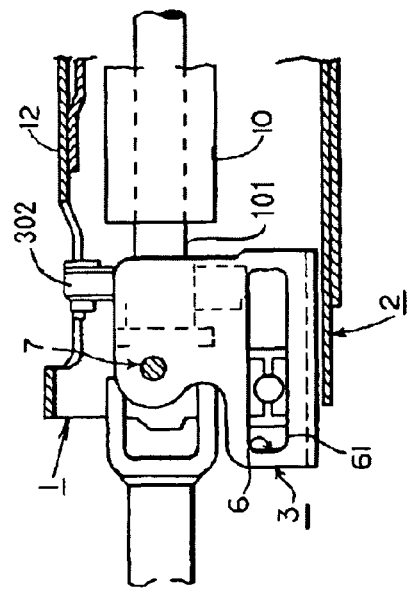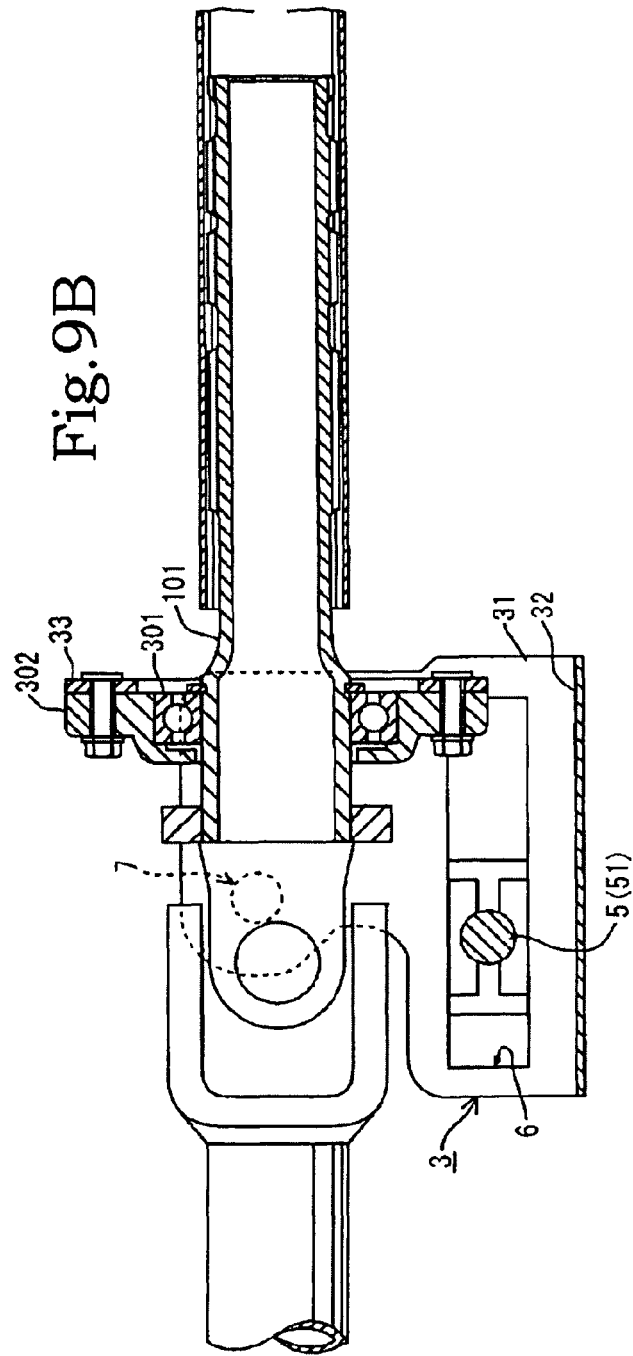

TILT TELESCOPIC STEERING DEVICE

BACKGROUND OF THE INVENTION

1. Field of the Invention

The present invention relates to a tilt telescopic steering device that allows significant enhancement of the tilt holding force of a tilt telescopic column.

2. Description of the Related Art

As examples of the background art, Japanese Patent Application Laid-open Nos. 2005-7905 and 2005-125994 describe steering devices comprising an ordinary tilt telescopic adjustment mechanism in which tilt and telescopic stroke are fixed by a lever at one site.

The features of Japanese Patent Application Laid-open No. 2005-7905 are analyzed next as a concrete example of the foregoing. During tilt in Japanese Patent Application Laid-open No. 2005-7905, a shaft rod member 23 act as a support shaft, while a shaft rod member 18 and a movable bracket 4 pivot along a tilt long hole, in the up-and-down direction relative to the a fixed bracket 3. During a telescopic stroke, meanwhile, the movable bracket 4 is displaced relative to the shaft rod members 18, 23, in a front-rear direction, via a telescopic long hole 17 of the movable bracket 4. The rotation shaft for tilt is slidable during the telescopic stroke, but fixed during tilt. The shaft rod member 23, moreover, is slidably provided, although it is fixed during driving travel. Tilt telescopic fixing (locking) is carried out at one site by way of a lever 20 mounted on the shaft rod member 18.

In Japanese Patent Application Laid-open No. 2005-7905, having a tilt fulcrum A (center of rotation: shaft rod member 23), an action point B (lever fastening position: shaft rod member 18), and a force point C where the handle tilts, the force exerted on the force point C acts on the action point B (lever fastening position) with a high ratio. To increase the tilt holding force (force acting on the force point C) during lever fastening, therefore, it becomes necessary to increase the torque for fastening the lever at the action point B. Japanese Patent Application Laid-open No. 2005-125994 has the same problem.

SUMMARY OF THE INVENTION

In light of the foregoing, the problem (for instance, technical problem and purpose) to be solved by the invention is to realize a steering device in which the tilt holding force can be considerably enhanced during driving and steering, by distributing, over a plurality of sites, a force that is applied to a lever fastening position through a tilting movement of a tilt telescopic mechanism.

As a result of diligent research directed at solving the above problem, the invention of claim 1 solves the above problem by way of a tilt telescopic steering device, comprising a fixed bracket fixed to a vehicle; a movable bracket capable of moving relative to the fixed bracket; an intermediate bracket which movably supports the movable bracket in the axial direction, is rotatably pivoted on the fixed bracket and is provided with a bearing for rotatably supporting a steering shaft; a lock shaft for tiltably and telescopically fixing the fixed bracket and the movable bracket at a predetermined position; and a connecting shaft for telescopically fixing the movable bracket and the intermediate bracket.

The invention of claim 2 solves the above problem by way of the tilt telescopic steering device having the above features and wherein the telescopic adjustment part comprises a horizontal long hole formed in the movable bracket that is connected to the intermediate bracket via the connecting shaft inserted into the horizontal long hole. The invention of claim 3 solves the above problem by way of the tilt telescopic steering device having the above features and wherein the telescopic adjustment part comprises a horizontal long hole formed in the movable bracket that is connected to the intermediate bracket via the connecting shaft inserted into the horizontal long hole.

The invention of claim 4 solves the above problem by way of the tilt telescopic steering device having the above features and wherein the telescopic adjustment part comprises a horizontal long hole formed in the intermediate bracket, the connecting shaft being fastened to the horizontal long hole. The invention of claim 5 or 6 solves the above problem by way of the tilt telescopic steering device having the above features and wherein the fixed bracket and the movable bracket are fixed with the lock shaft at a predetermined position via a tilt adjustment hole and a telescopic adjustment hole.

Further, the invention of claim 7 or 8 solves the above problem by way of the tilt telescopic steering device having the above features and wherein the lock shaft is fastened and fixed with a lock bolt, and the connecting shaft is fastened and fixed with a fastening bolt via a bush. The invention of claim 9 or 10 solves the above problem by way of the tilt telescopic steering device having the above features and wherein the pivoting site of the intermediate bracket constitutes a tilt pivot.

The invention of claim 1 allows obtaining higher rigidity in a steering column, and allows considerably enhancing the tilt holding force of a tilt telescopic column. The inventions of claims 2 and 3 afford the same effect as the invention of claim 1. The invention of claim 4 allows obtaining a yet more stable tilt holding force. The invention of claim 5 or 6 provides a simple constitution, while the invention of claim 7 or 8 allows obtaining a yet more stable tilt holding force. The invention of claim 9 or 10 allows obtaining an even yet more stable tilt holding force.

BRIEF DESCRIPTION OF THE DRAWINGS

FIG. 5A is a perspective-view diagram of the intermediate bracket, FIG. 5B is a cross-sectional diagram of the telescopic configuration of the intermediate bracket and the movable bracket;

FIG. 9A is cross-sectional side-view diagram of a relevant portion of the present invention, and FIG. 9B is an enlarged cross-sectional diagram of a site of the steering shaft and the intermediate bracket in FIG. 9A.

DESCRIPTION OF THE PREFERRED EMBODIMENTS

Figure 1:
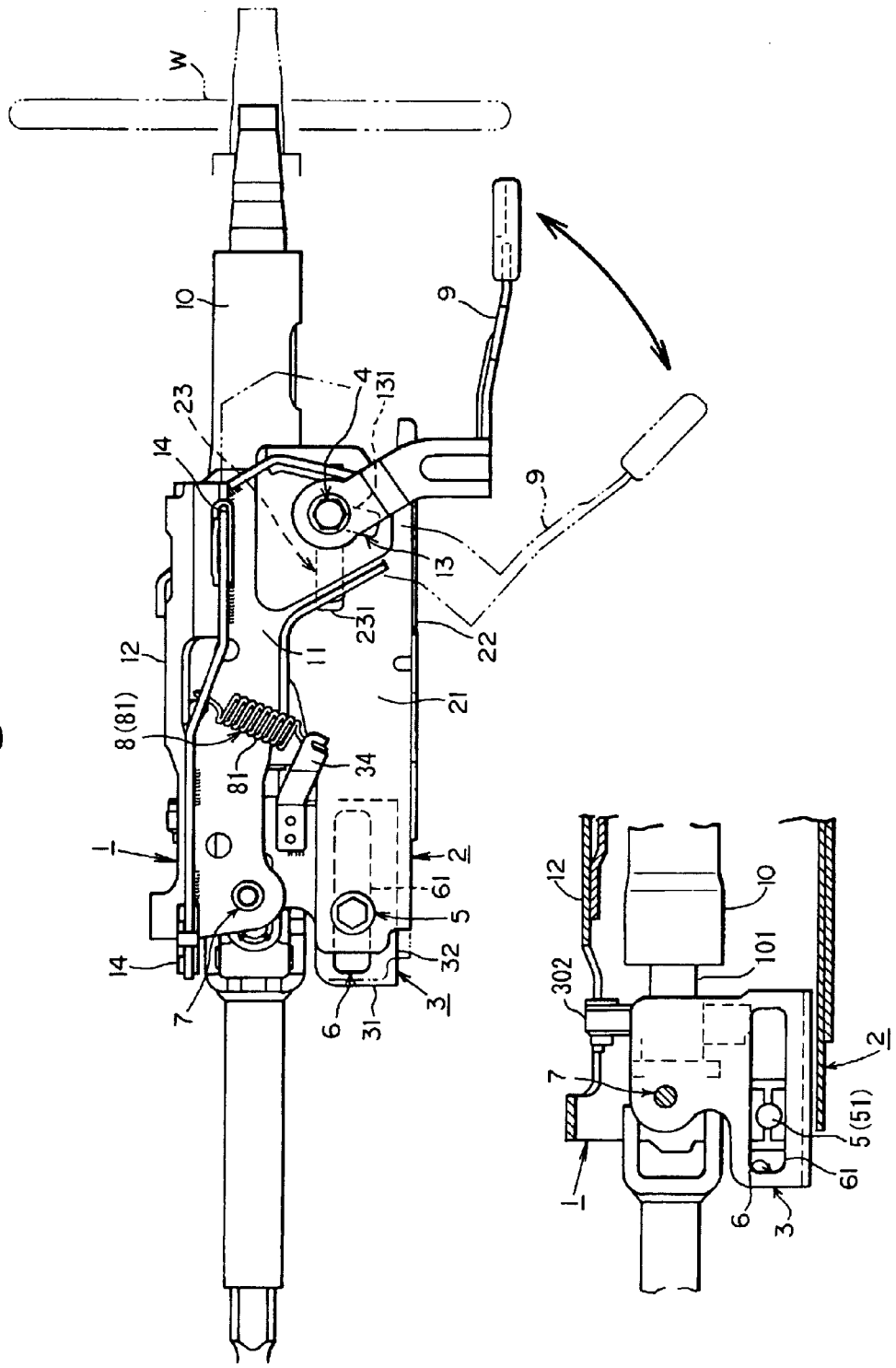
FIG. 1A is a side-view diagram of the present invention.
FIG. 1B is a cross-sectional side-view diagram of a relevant portion of FIG. 1A.
Figure 2:
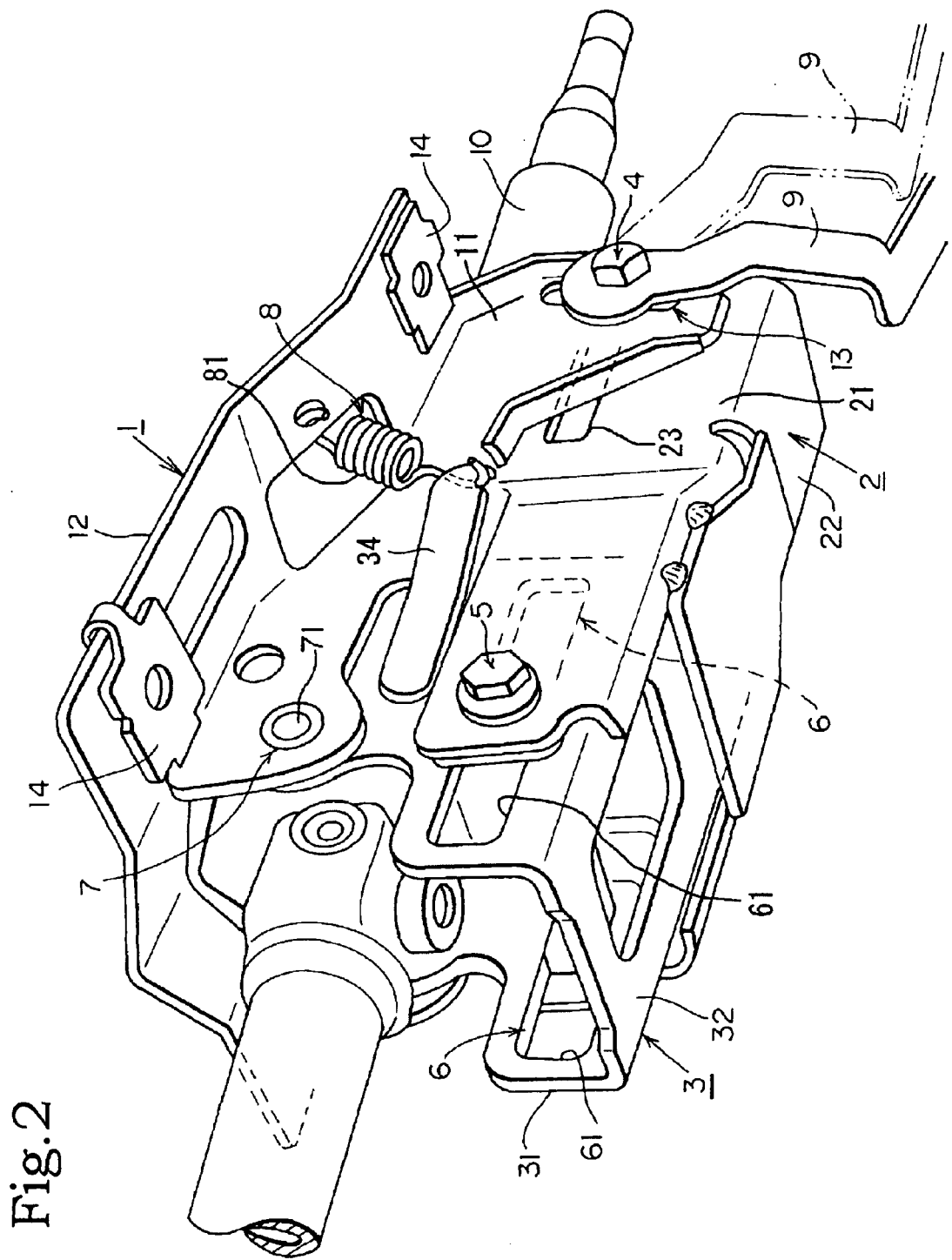
FIG. 2 is a perspective-view diagram of the present invention.
Figure 3:
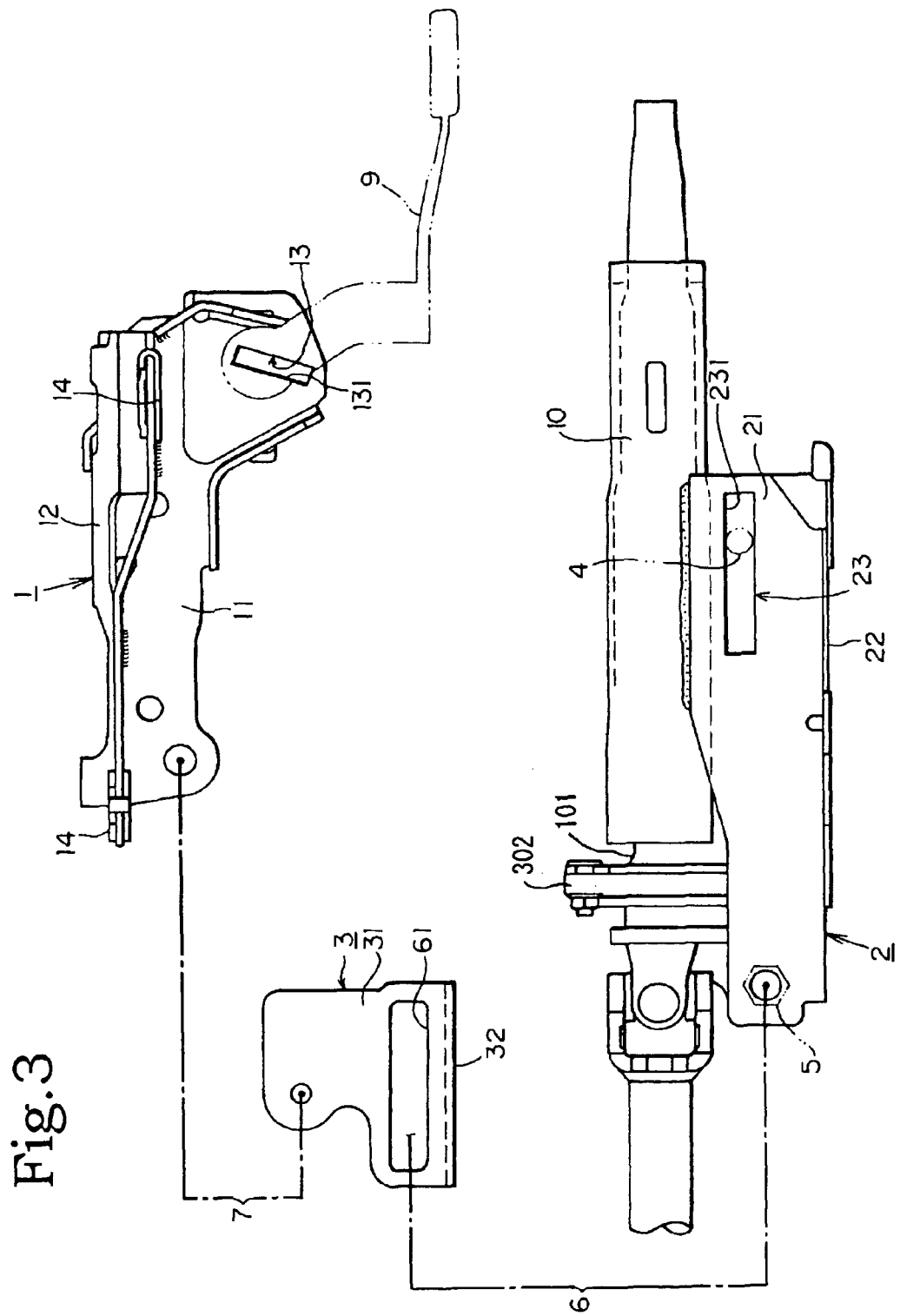
FIG. 3 is an exploded side-view diagram of the main members of the present invention.

Embodiments of the present invention are described next with reference to accompanying drawings. As illustrated in FIGS. 1 to 3, the present invention is a structure joined, or connected via various members, to a steering column 10, for tilting and telescopically moving the steering column 10. The main feature of the present invention comprises a fixed bracket 1, a movable bracket 2, an intermediate bracket 3, a lock shaft 4 inserted through the fixed bracket 1 and the movable bracket 2 and fixed at a predetermined position, a telescopic adjustment part 6 and a connecting shaft 5 connected to the movable bracket 2 and the intermediate bracket 3, a pivot shaft 7 for rotationally pivoting the fixed bracket 1 and the intermediate bracket 3, a spring member 8, and an operating lever 9.

As illustrated in FIG. 1A, FIG. 2, FIG. 3, FIGS. 4A and 4B, the fixed bracket 1 comprises a pair of left and right support side plates 11, 11 and a mounting top portion 12. The mounting top portion 12, which is attached at a predetermined position in the vehicle, for instance, via slide capsule members 14, 14 and so forth, has a structure such that it accommodates resistance while sliding at the mounting position, only during impacts such as collisions or the like, while absorbing the impact energy, and thereby softening the impact and protecting the driver from accidents.

Figure 4A:
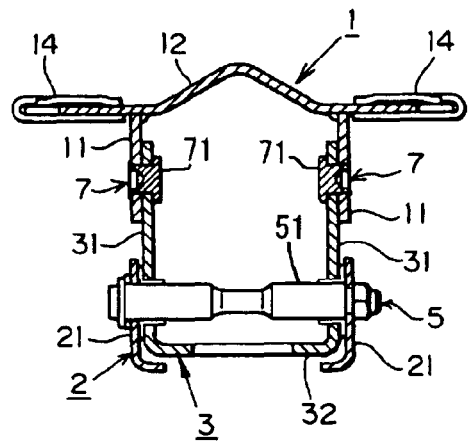
FIG. 4A is a cross-sectional diagram of a relevant portion of the present invention.
Figure 4B:
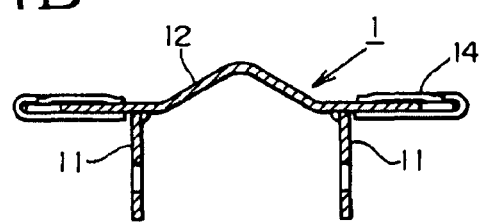
FIG. 4B is a front-view diagram of a fixed bracket.
Figure 4C:
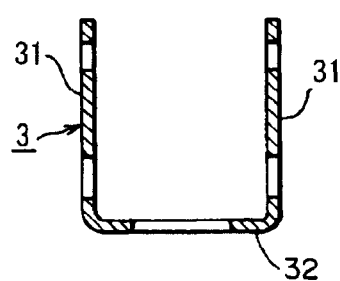
FIG. 4C is a cross-sectional diagram of an intermediate bracket.
Figure 4D:
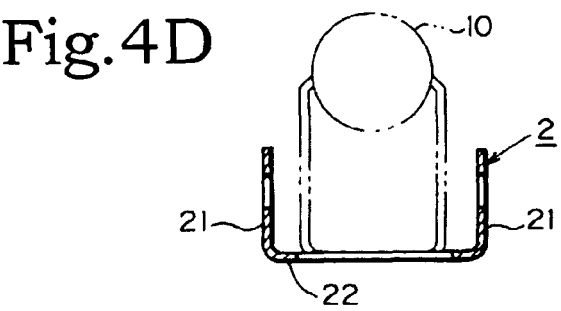
FIG. 4D is a cross-sectional diagram of a movable bracket.
Figure 6:
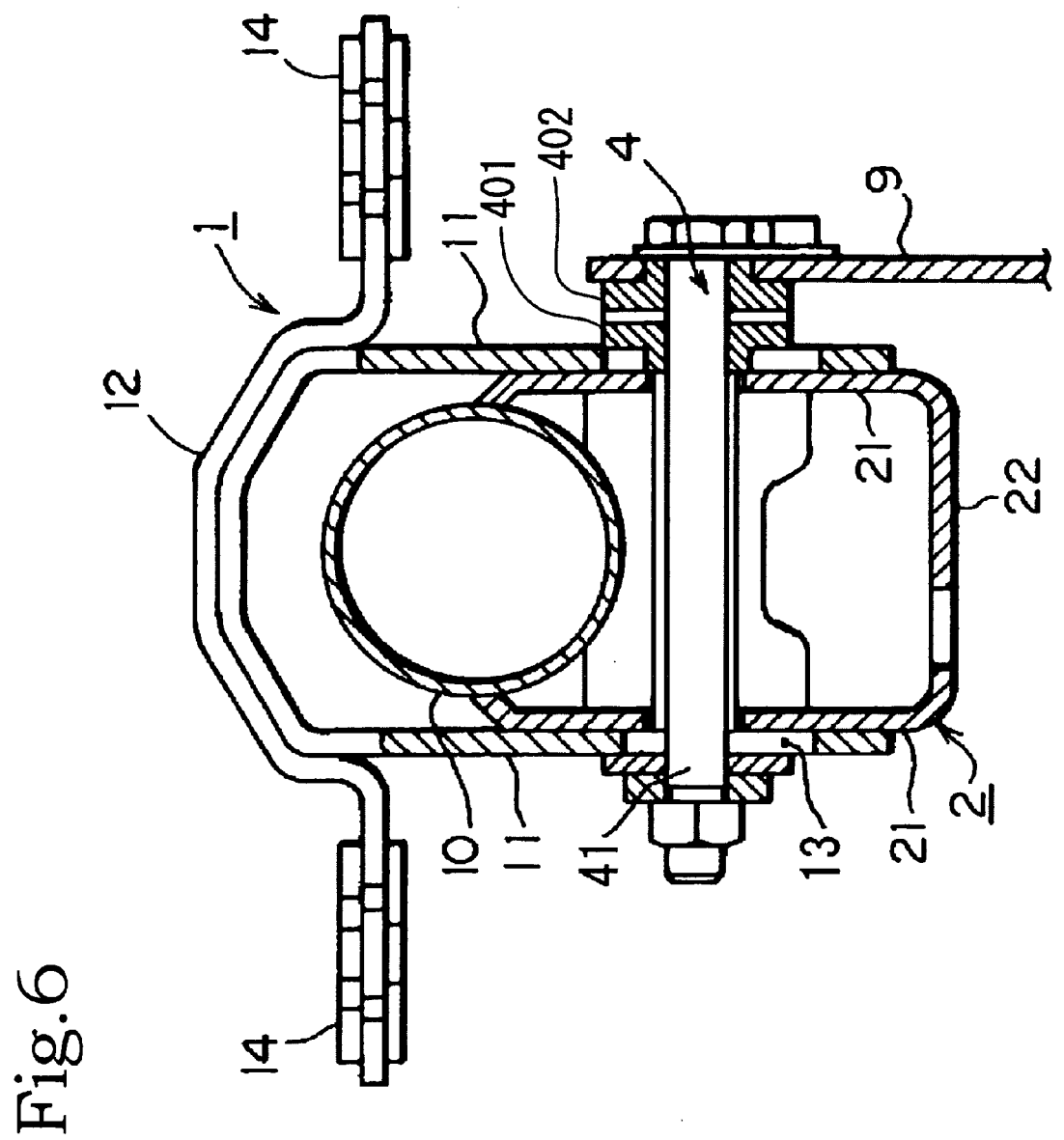
FIG. 6 is a cross-sectional diagram of FIG. 1 along the arrow X-X.
Figure 7A:
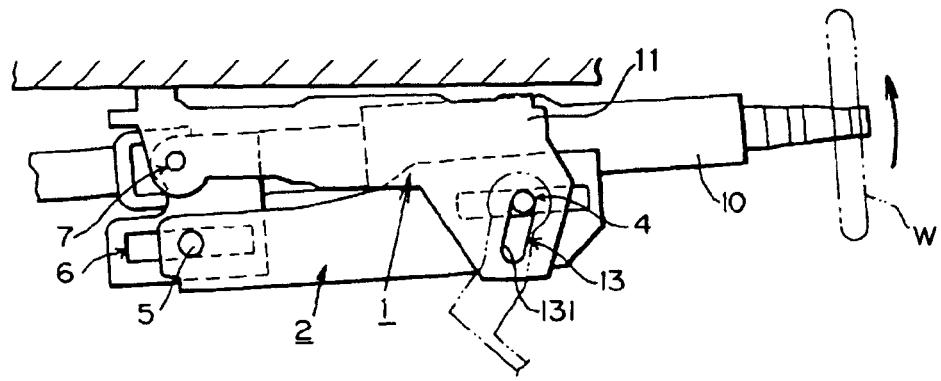
FIG. 7A is a schematic side-view diagram of a steering column in a raised state resulting from a tilt operation.
Figure 7B:
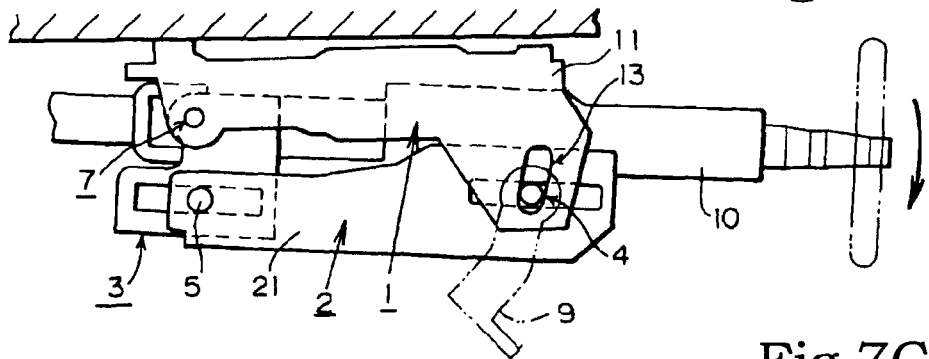
FIG. 7B is a schematic side-view diagram of the steering column in a lowered state resulting from a tilt operation.
Figure 7C:
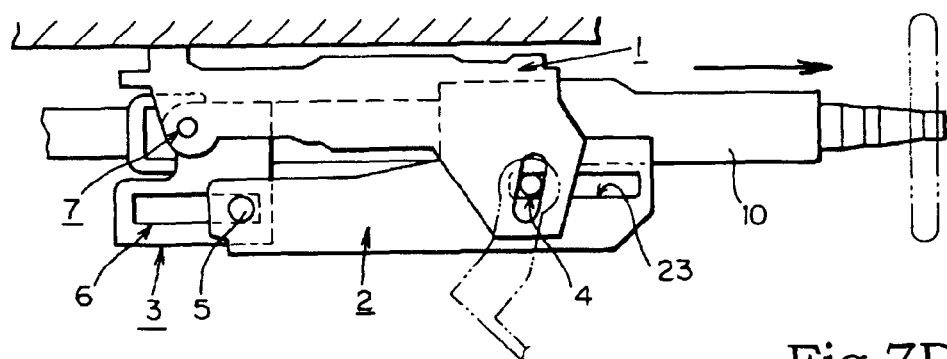
FIG. 7C is schematic side-view diagram of the steering column extended towards the driver (rightwards) as a result of a telescopic operation.
Figure 7D:
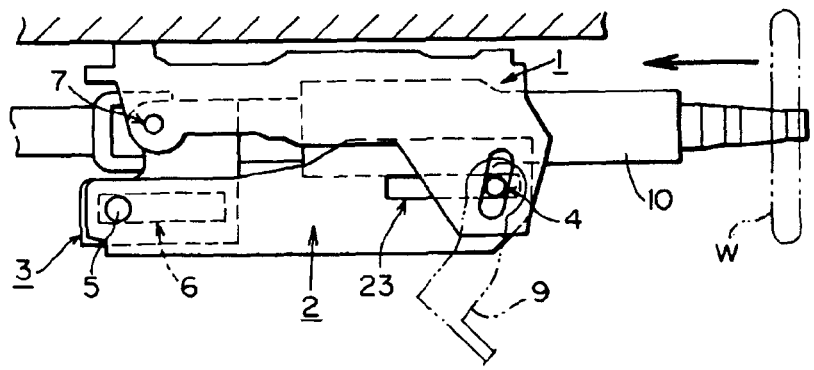
FIG. 7D is schematic side-view diagram of the steering column extended towards the engine (leftwards) as a result of a telescopic operation.

As illustrated in FIGS. 1A, FIG. 2, FIG. 4D and so forth, the movable bracket 2 has a substantially U-shaped cross section, and has formed, at a bottom 22 thereof, column supports 21, 21 at both sides in the width direction. The two column supports 21, 21 support and fix the steering column 10. The two column supports 21, 21 are mounted, clamped by the lock shaft 4, between the two support side plates 11, 11 of the fixed bracket 1 (see FIG. 6). The fixed bracket 1 and the movable bracket 2 are connected via tilt adjustment holes 13, 13, telescopic adjustment holes 23, 23 and the lock shaft 4. The lock shaft 4 is coupled by being inserted through cams 401, 402. The cams 401, 402 engage, thereby fixing the lock shaft 4, when the operating lever 9 is brought to a horizontal attitude relative to the steering column 10.

As illustrated in FIG. 3, the tilt adjustment holes 13, 13 are formed as vertical long holes at an appropriate position of the two support side plates 11, 11. The vertical long hole 131 has an arcuate shape. That is, the long hole 131 is formed to a radial arcuate shape around the pivot shaft 7. As illustrated in FIG. 3, the telescopic adjustment holes 23, 23 are formed as horizontal long holes 231, 231 at the ends of the movable bracket 2 in the longitudinal direction. The telescopic adjustment holes 23, 23 enable the tilting movement and the telescopic movement of the movable bracket 2 with respect to the fixed bracket 1. The tilt adjustment hole 13, as the vertical long hole long holes 131, enables tilt adjustment, while the telescopic adjustment hole 23, as the horizontal long hole 231, enables telescopic adjustment.

The movable bracket 2 and the intermediate bracket 3 are connected via the telescopic adjustment parts 6, 6 and the connecting shaft 5 (see FIG. 1, FIG. 5B). The telescopic adjustment parts 6, 6 are formed as horizontal long holes 61, 61 at the lower portion of the intermediate bracket 3. A bush 601 is slidably fitted on each horizontal long hole 61. The connecting shaft 5 is inserted through the bush 601. The bush 601 enhances slidability by reducing looseness between the movable bracket 2 and the intermediate bracket 3. The bush 601 enables the telescopic movement of the movable bracket 2 with respect to the intermediate bracket 3.

Figure 8A:
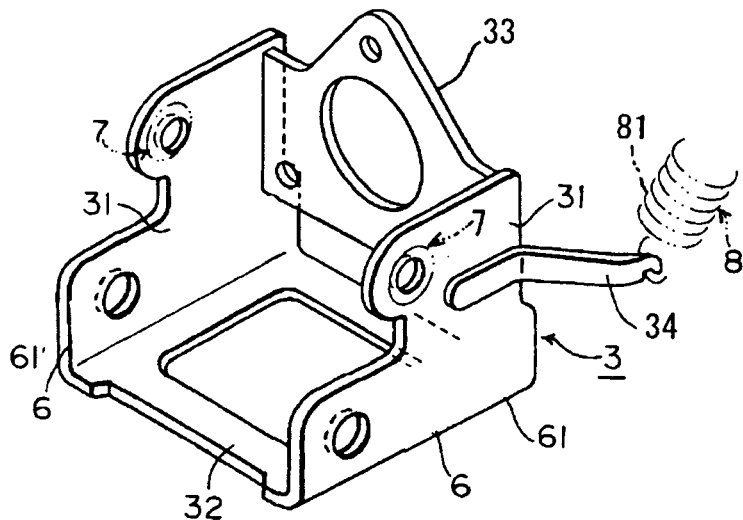
FIG. 8A is a perspective-view diagram of another embodiment of the intermediate bracket.
Figure 8B:
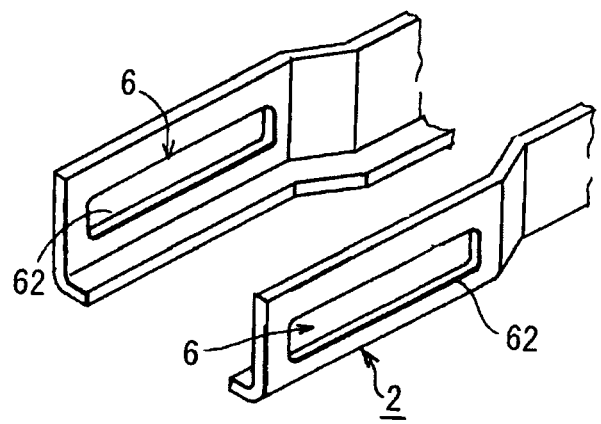
FIG. 8B is a perspective-view diagram of another embodiment of the movable bracket.
Figure 8C:
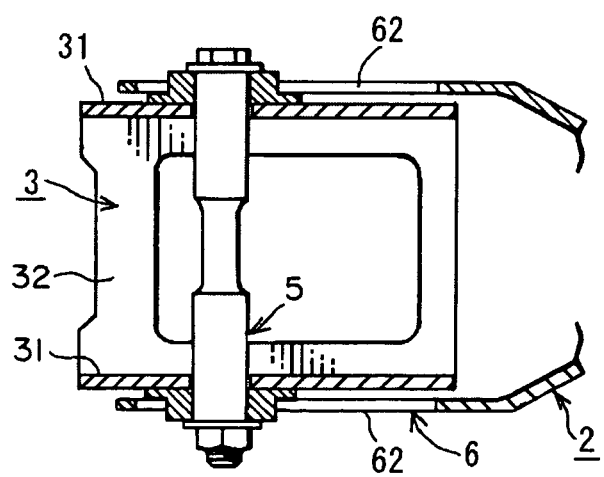
FIG. 8C is a cross-sectional diagram of the telescopic configuration of the intermediate bracket and the movable bracket in another embodiment.

As illustrated in FIG. 8B, the telescopic adjustment part 6 is formed as horizontal long holes 62, 62 at the ends of the movable bracket 2 in the longitudinal direction. The connecting shaft 5 is provided in the intermediate bracket 3, and thus the movable bracket 2, need only perform a telescopic movement relative to the intermediate bracket 3. The horizontal long holes 61, 62 that form the telescopic adjustment part 6 are not limited to being provided in the intermediate bracket 3 or the movable bracket 2.

The fixed bracket 1 and the intermediate bracket 3 are configured so as to be rotatably supported by the pivot shaft 7, as illustrated in FIG. 1A and FIG. 4A. Specifically, the pivot shaft 7 constitutes a pivot 71 for tilting movement. As a result, the intermediate bracket 3 rotates relative to the fixed bracket 1 during the tilt operation, but remains fixed during a telescopic operation.

The movable bracket 2 and the intermediate bracket 3 are fastened and fixed with the connecting shaft 5, by way of the telescopic adjustment parts 6, 6. The connecting shaft 5 is located at the site at which sliding takes place. As illustrated in FIG. 5A, the intermediate bracket 3 comprises the two support side plates 31, 31, a bottom 32 between the two support side plates 31, 31, at the lower portion of the latter, and an end bracket 33 between the two support side plates 31, 31. A flange 302 of a bearing 301 that supports a steering shaft 101 is mounted on the lead end bracket 33 of the intermediate bracket 3, via bolts and nuts (see FIG. 9B).

A fixing hook 34 for latching one end (lower end) of the spring member 8 is formed on one of the two support side plates 31, 31 of the intermediate bracket 3 (see FIG. 1A). The fixing hook 34 is attached to the support side plate 31, for instance, through welding of another member (see FIG. 8A). The other end of the spring member 8 (upper end) is latched to an appropriate latching portion of the mounting top portion 12 of the fixed bracket 1. The spring member 8 is provided here, specifically, as a tension coil spring 81, but is not limited thereto. So long as it pulls the intermediate bracket 3 upwards, the spring member 8 may be configured as a torsion spring or the like.

The movement of the device will be explained next. During tilt operation, a steering wheel W (handle) is moved up and down to match the body of the driver. To that end, the fixed state of the lock shaft 4 is released by way of the operating lever 9 (clockwise rotation in FIG. 1A), to raise or lower thereby the steering column 10. Specifically, the steering column 10, the movable bracket 2 and the intermediate bracket 3 appropriately rotate around the pivot shaft 7, as a fulcrum. The lock shaft 4 is then fixed by the operating lever 9 (counterclockwise rotation in FIG. 1A).

During telescopic operation, the steering wheel W (handle) is moved back and forth to adapt to the body of the driver. To that end, the operating lever 9 is released and the steering column 10 is moved back and forth. Specifically, the movable bracket 2 is moved back and forth, relative to the fixed bracket 1 and the intermediate bracket 3, by way of the telescopic adjustment holes 23 and the telescopic adjustment parts 6, with the pivot shaft 7 as a support. The lock shaft 4 is then fixed at a desired position by the operating lever 9. This completes the tilt operation and the telescopic operation. The above tilt operation and telescopic operation are carried out in combination during adjustment of the steering column 10 to a good handle position suited to the body of the driver.

The movement during driving travel will be explained next. That is, ordinary driving travel takes place once the tilt operation and the telescopic operation are over. The forces acting in this case are depicted in, for instance, FIG. 1A and FIG. 7. The fulcrum (center of rotation) during the tilt operation or the telescopic operation of the steering column 10 and the steering wheel W is located at the pivot shaft 7. Next, the driver holds the steering wheel W, which receives thereupon the load of the arms alone, although the weight of the driver may add partially to that load.

When in that situation a force is exerted on the lever fastening position, a force from the steering column 10 acts on the steering shaft 101, in the tilt direction. Therefore, the structure for supporting this force is one part of the element that maintains the tilt holding force. In the present invention, the bearing 301 that supports the steering shaft 101 is mounted on the end bracket 33 of the intermediate bracket 3, and hence the force acting on the steering shaft 101 in the tilt direction is sequentially supported by the steering column 10, the movable bracket 2, the fixed bracket 1 and the vehicle body, and, besides, by the bearing 301, the intermediate bracket 3, the fixed bracket 1 the vehicle body, in this order, and by the steering column 10, the movable bracket 2, the intermediate bracket 3, the fixed bracket 1 and the vehicle body, in this order. As a result, the structure of the present invention, comprising the intermediate bracket 3 having the bearing 301 fixed thereto, affords a higher tilt holding force than in conventional art, where no intermediate bracket is provided.

What is claimed is:

1. A tilt telescopic steering device, comprising:
   a fixed bracket fixed to a vehicle, said fixed bracket having a tilt adjustment hole formed therein;
   a movable bracket capable of moving relative to the fixed bracket, the movable bracket having a telescopic adjustment hole formed therein;
   an intermediate bracket, which movably supports said movable bracket in an axial direction, rotatably pivoted on said fixed bracket and provided with a bearing for rotatably supporting a steering shaft;
   a lock shaft for tiltably and telescopically fixing said movable bracket at said fixed bracket at a predetermined position;
   a connecting shaft for telescopicably fixing said movable bracket at said intermediate bracket; and
   a pivot shaft for rotationally pivoting said intermediate bracket at said fixed bracket,
   wherein said movable bracket is connected to said intermediate bracket by way of a horizontal long hole formed in the intermediate bracket and said connecting shaft that is slidably engaged and held on the horizontal long hole.

2. The tilt telescopic steering device according to claim 1, wherein said fixed bracket and said movable bracket are fixed with said lock shaft at a predetermined position via said tilt adjustment hole and said telescopic adjustment hole.

3. The tilt telescopic steering device according to claim 2, wherein the tilt adjustment hole comprises a vertical elongated hole formed around the pivot shaft.

4. The tilt telescopic steering device according to claim 2, wherein the telescopic adjustment hole comprises a horizontal elongated hole formed at an end of the movable bracket.

5. The tilt telescopic steering device according to claim 1, wherein said lock shaft is fastened and fixed with a lock bolt, and said connecting shaft is fastened and fixed with a fastening bolt via a bush.

6. The tilt telescopic steering device according to claim 1, wherein the pivoting site of said intermediate bracket constitutes a tilt pivot.

7. The tilt telescopic steering device according to claim 1, wherein the fixed bracket comprises a mounting portion slidably attached on the vehicle.

8. The tilt telescopic steering device according to claim 1, further comprising a bush slidably fitted within the horizontal long hole.

9. The tilt telescopic steering device according to claim 8, wherein the connecting shaft is inserted through the bush.

10. The tilt telescopic steering device according to claim 1, wherein the movable bracket comprises a column support, which supports a steering column.

11. The tilt telescopic steering device according to claim 10, wherein a fulcrum during a tilting operation or a telescopic operation of the steering column and a steering wheel is located on the pivot shaft.

12. The tilt telescopic steering device according to claim 1, wherein the intermediate bracket rotates relative to the fixed bracket during a tilt operation and is fixed during a telescopic operation.

13. The tilt telescopic steering device according to claim 1, wherein the pivot shaft comprises a pivot for tilting movement.

* * * * *